June 3, 1930.  G. F. WOMRATH  1,761,003
PULLEY STRUCTURE
Filed Jan. 11, 1928
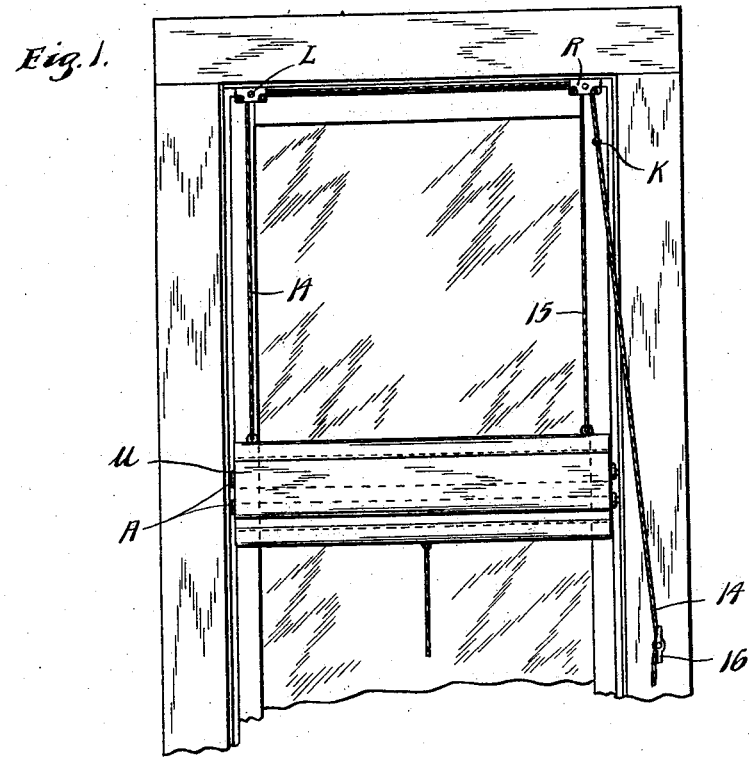
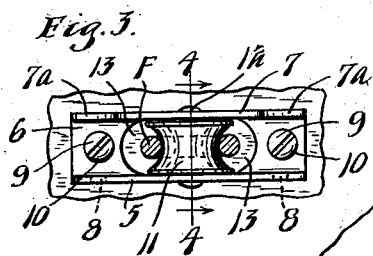
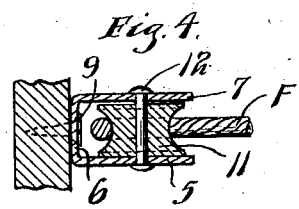
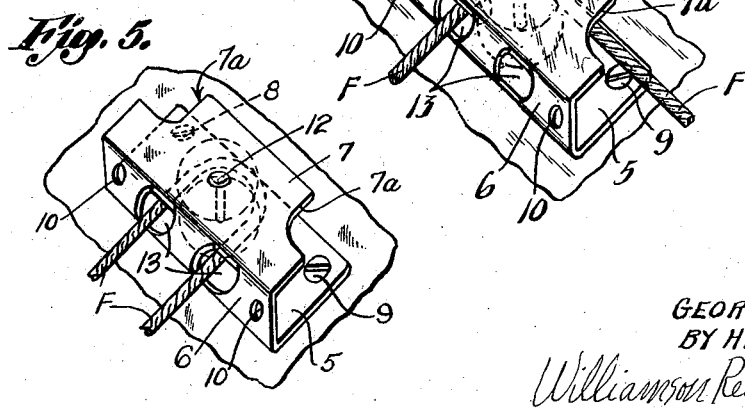
INVENTOR.
GEORGE F. WOMRATH
BY HIS ATTORNEYS.

Patented June 3, 1930

1,761,003

UNITED STATES PATENT OFFICE

GEORGE F. WOMRATH, OF MINNEAPOLIS, MINNESOTA

PULLEY STRUCTURE

Application filed January 11, 1928. Serial No. 245,941.

This invention relates to pulley structure, capable of wide general application.

Commercial forms of pulleys marketed at this time are for the most part cumbrous for attachment, and limited in application. In most of such devices the cord, cable or other flexible member passing over the pulley wheel can only operate in one direction and the bracket of the pulley can only be mounted in one position relative to its supporting surface. Furthermore, most commercial pulleys are noisy in operation, unsightly in appearance, and of such structure that excessive wear is often placed on the flexible member.

It is the main object of my invention to provide an extremely simple but efficient pulley structure, obviating the above enumerated objections, capable of being attached in a plurality of different manners and adapted to permit the cord or flexible member to be inserted from any direction and constructed to afford an unobstructed passage over the pulley.

It is a further object to provide a compact noiseless pulley structure, requiring a very small supporting surface for attachment, adapted for universal application and so constructed that the cord or flexible member will never be subjected to excessive wear or friction but may extend freely from the pulley wheel although applied and threaded over said wheel in various ways.

Another object of the invention is to provide a pulley structure of the class above described, which will be free from sharp edges and corners, thus preventing undue wear or friction on the flexible member, in which it is impossible for the cord or flexible member to wedge between the pulley wheel and its supporting bracket and which may be easily fastened to a small area of supporting surface in any desired position the pulley bracket being capable of application edgewise, sidewise and, of course, at any angle in either attachment, provision being made to direct the flexible member through the back or front of the pulley bracket or from either end thereof.

These and other objects and advantages of the invention will be apparent from the following description made in connection with the accompanying drawings wherein like reference characters refer to similar parts throughout the several views, and in which, Fig. 1 is a front elevation of a window showing an application of my pulley structure in connection with adjustable shade hangers;

Fig. 2 is a perspective view of a preferred embodiment of the invention applied to a flat supporting surface, illustrating one application of the cord or flexible member;

Fig. 3 is a front elevation of said embodiment applied edgewise to a supporting surface;

Fig. 4 is a vertical cross section taken on line 4—4 of Fig. 3; and

Fig. 5 is a perspective view of said embodiment, with one of its parallel sides attached to a supporting surface and illustrating a different application of the cord or flexible member.

As shown in the drawings, my device comprises a channeled pulley casing or bracket of U-shaped cross section having a relatively wide attachment side 5, a relatively narrow intermediate side 6, also adapted for attachment, and a flat side 7 oppositely disposed to attachment side 5 and having cut out corners 7ª, the purpose of which will later be described. Sides 5 and 7 extend perpendicularly to the intermediate edge 6. My bracket is preferably formed by stamping or pressing a flat sheet of material into the U-shaped form above described, but may, of course, be cast or otherwise constructed as desired. An attachment aperture 8 is provided through each of the outer corners of the rectangular side 5 of the pulley bracket adapted to accommodate bolts or screws and being so positioned that the retaining members, such as the screws 9 may be readily accessible due to the cut out corners 7ª of the side 7 of the bracket. The intermediate side 6 of my pulley bracket is also provided with a pair of attachment ports 10, one disposed adjacent each end, said ports being accessible for securing the retaining members 9 through the open side of the bracket.

Snugly disposed within the U-shaped bracket I mount my pulley wheel 11, its axis extending normal to sides 5 and 7 and parallel with the intermediate side 6. Pulley wheel 11 preferably has a sharply concaved face and flat sides, which are disposed substantially flush with the inner surfaces of sides 5 and 7. A pin 12 may extend through the sides 5 and 7 of the bracket having its ends clinched against the outer surfaces of said sides and pulley wheel 11 is snugly mounted for rotation on said pin. A pair of relatively large apertures 13 are formed in the intermediate side 6 of the bracket having their centers tangentially alined with the opposite sides of pulley wheel 11 and of such dimension that a cord or flexible member F may pass around the pulley in the manner shown in full lines in Fig. 2 or Fig. 5, without striking the edges of side 6 defining said apertures.

By properly machining my axle pin 12 and by properly drilling the hole through the pulley wheel, the wheel, although having its sides snugly fitting within the bracket, will turn freely and noiselessly.

In Fig. 1 one application of my pulleys is shown in connection with adjustable shade hangers. Here a pair of my pulley structures are attached with the back sides 6 flush against the narrow horizontal surface at the top of a sash frame. A pair of rollers A are horizontally mounted in suitable supports attached to the opposite vertical inner sides of the sash frame. As shown, the shades are adapted to overlap at the inner section of the upper and lower window sashes. The upper shade U has its slat supported at its ends by a pair of flexible cords 14 and 15. The longer cord 14 extends vertically to the left and through pulley L passing over the pulley wheel through the open side of the bracket and out horizontally through one of the ends of the bracket. Cord 14 also passes over the pulley wheel of the right hand pulley R. The cord 15 extends vertically passing over the wheel of pulley R and downwardly, being joined at K to the cord 14, cord 14 being of sufficient length to extend and be secured to a suitable cleat 16 secured to the facing of the sash frame.

It will be obvious from the foregoing description that my pulley bracket may be attached to a supporting surface in a multiplicity of different manners. Either the relatively wide side 5 may be attached by applying screws or bolts 9 through the apertures 8, side 5 being flush against the supporting surface, or the narrow side 6 may be disposed flush against the supporting surface and bolts 9 applied, as illustrated in Figs. 3 and 4. In either of said attachments various angular positions of pulley bracket may, of course, be effected to dispose the axis of pulley wheel 11 in such a manner that the cord or flexible member F may be trained over the pulley without friction and without the possibility of scraping against any portion of the bracket. It will be seen that only a very narrow width of supporting surface is necessary whether the pulley bracket is attached edgewise or sidewise, attachment holes 8 being alined and the line connecting said holes extending parallel to the back or intermediate side 6 of the bracket.

Pin 12 is so positioned that ample clearance is provided between the back 6 and the pulley wheel whereby the flexible member F may be conveniently disposed between the pulley wheel and back in the different manners shown in Figs. 2 and 3 in full and dotted lines.

The cord F may further be disposed with one or two leaves thereof passing through the back 6 of the bracket, as shown in Fig. 2.

From the foregoing description it will be seen that I have provided a very simple but extremely efficient pulley structure capable of manufacture at low cost and adapted to obviate the objections to pulleys commercially manufactured at this time, while affording many new and improved results over the same.

It will, of course, be understood that various changes may be made in the form, details, arrangement and proportions of the parts without departing from the scope of the invention.

What is claimed is:

1. Pulley structure comprising a bracket of U-shaped cross section having a pair of parallel sides and an intermediate side extending substantially perpendicular to said parallel sides, a pulley wheel revolubly mounted between said parallel sides and having its axis disposed substantially normal thereto, said intermediate side having a pair of spaced openings through which a flexible member may pass to engage said pulley wheel, means for attaching said bracket to a supporting surface with one of said parallel sides substantially flush thereagainst, and means for attaching said bracket to said surface with said intermediate side disposed substantially flush thereagainst.

2. Pulley structure having in combination a bracket comprising a single plate of U-shaped cross section having a pair of flat parallel sides, open ends, and an intermediate relatively narrow side extending perpendicular to said parallel sides, a single pulley wheel revolubly mounted between said parallel sides with its axis perpendicular thereto, said intermediate side having a relatively large opening arranged tangentially with respect to said pulley wheel, said intermediate side also having attachment means whereby the bracket may be secured to a surface with said intermediate side disposed flush thereagainst, and one of said parallel sides having attachment means whereby said bracket may be secured to a surface with said last mentioned side disposed flush thereagainst.

In testimony whereof I affix my signature.

GEORGE F. WOMRATH.